United States Patent
Kumar et al.

(10) Patent No.: US 9,508,079 B2
(45) Date of Patent: Nov. 29, 2016

(54) PRIVACY-COUNSCIOUS ADVERTISING

(75) Inventors: Bharat Kumar, Bridgewater, NJ (US); Stanley Chow, Ottawa (CA)

(73) Assignee: Alcatel Lucent, Boulogne-Billancourt (FR)

(*) Notice: Subject to any disclaimer, the term of this patent is extended or adjusted under 35 U.S.C. 154(b) by 1974 days.

(21) Appl. No.: 12/545,633

(22) Filed: Aug. 21, 2009

(65) Prior Publication Data

US 2011/0047032 A1    Feb. 24, 2011

(51) Int. Cl.
G06Q 30/00 (2012.01)
G06Q 30/02 (2012.01)

(52) U.S. Cl.
CPC .......... *G06Q 30/02* (2013.01); *G06Q 30/0269* (2013.01)

(58) Field of Classification Search
CPC .......................... G06Q 30/02; G06Q 30/0269
USPC ....................................................... 705/14.66
See application file for complete search history.

(56) References Cited

U.S. PATENT DOCUMENTS

2005/0038698 A1* 2/2005 Lukose .............. G06Q 30/0275
705/14.71

* cited by examiner

*Primary Examiner* — John Van Bramer
(74) *Attorney, Agent, or Firm* — Kramer & Amado, P.C.

(57) ABSTRACT

Various exemplary embodiments relate to a method and related network element including one or more of the following: receiving a plurality of advertisement messages via the communications network, each advertisement message of the plurality of advertisement messages including a set of meta-information which describes the content of an advertisement associated with the advertisement message; determining whether each advertisement message is relevant to the user by comparing the set of meta-information to a set of user preferences associated with the user, the set of user preferences stored locally on the user node; when an advertisement message is determined to not be relevant to the user, discarding the advertisement message; and when an advertisement message is determined to be relevant to the user, providing the user with access to the advertisement associated with the advertisement message.

20 Claims, 4 Drawing Sheets

| Identifier | Meta-information | Ad Content | Expiration |
|---|---|---|---|
| 4Jg32x | {video games; computers} | 0x6B9939F2... | 1740960000 |
| H680nD | {canned food} | 0x754B059A... | 1356048000 |
| ... | ... | ... | ... |

FIG. 3

| User ID | Preferences |
|---|---|
| 202.85.67.158 | {apparel} |
| 168.65.123.142 | {electronics; entertainment} |
| 187.102.52.146 | {} |
| ... | ... |

PRIVACY-COUNSCIOUS ADVERTISING

TECHNICAL FIELD

This invention relates generally to electronic advertisement dissemination.

BACKGROUND

Since the advent of the Internet, advertising has been one of the most attempted methods of capitalizing on the ever-growing number of users surfing the web. Through placing a banner on a website or sending generic emails out to a mailing list, advertisers attempt to make their pitches to millions of users in one fell swoop. Any advertisement, regardless of content, can draw in considerable amounts of business simply through the massive amounts of exposure afforded by the Internet.

While Internet advertising is cheap and effective, corporations are constantly searching for ways to boost the return on each dollar spent. Recent times have seen the introduction of targeted advertising in an attempt to further increase the efficiency of each advertisement. By viewing a user's browsing history, personal information, and other data, an advertising entity can select advertisements that are more likely to appeal to the user. By only displaying advertisements that a user would likely find interesting, the advertising entity can greatly increase the chances that a user seeing an advertisement will actually purchase the advertised product or service.

For example, when displaying ads to a user known to be a 20-year-old male, the advertising entity can skip showing advertisements for handbags and body lotion and instead display an advertisement for the current year's iteration of a college football video game. From the information known about the user, it is more likely that the user would be interested in, and therefore buy, the video game. Thus, the advertising entity has increased the efficiency of the video game advertisement, while avoiding wasting the user's time and the advertisers' money with the other two advertisements.

Many users, seeing an encroachment on their personal privacy, balk at this form of advertising and resist the idea of a corporation having access to any personal information that they have not explicitly provided. These users would prefer that all information about them be kept secret until they decide that such information should be revealed. Further, while a user may choose to reveal some personal information, it is likely that they would never choose to reveal all of their personal information even though such a disclosure would enable advertising entities to best target their advertisements. Accordingly, there is a need for a system that may direct advertisements to users based on all available personal information, while ensuring a maximum level or privacy.

The foregoing objects and advantages of the invention are illustrative of those that can be achieved by the various exemplary embodiments and are not intended to be exhaustive or limiting of the possible advantages that can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

SUMMARY

In light of the present need for a system that may direct advertisements to users based on all available personal information while ensuring a maximum level or privacy, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network element including one or more of the following: receiving a plurality of advertisement messages via the communications network, each advertisement message of the plurality of advertisement messages including a set of meta-information which describes the content of an advertisement associated with the advertisement message; determining whether each advertisement message is relevant to the user by comparing the first set of meta-information to a set of user preferences associated with the user, the set of user preferences stored locally on the user node; when an advertisement message is determined to not be relevant to the user, discarding the advertisement message; and when an advertisement message is determined to be relevant to the user, providing the user with access to the advertisement associated with the advertisement message.

It should be apparent that, in this manner, various exemplary embodiments enable the provisioning of privacy-conscious targeted advertising. In particular, by storing the user's preferences locally and comparing them to the meta-information contained in each received advertisement message, a user node may determine the advertisement message's relevance to the user. Thus, various exemplary embodiments enable the user to receive targeted advertisements while revealing a minimal amount of personal information to others.

BRIEF DESCRIPTION OF THE DRAWINGS

In order to better understand various exemplary embodiments, reference is made to the accompanying drawings, wherein.

DETAILED DESCRIPTION

Referring now to the drawings, in which like numerals refer to like components or steps, there are disclosed broad aspects of various exemplary embodiments.

Figure 1:
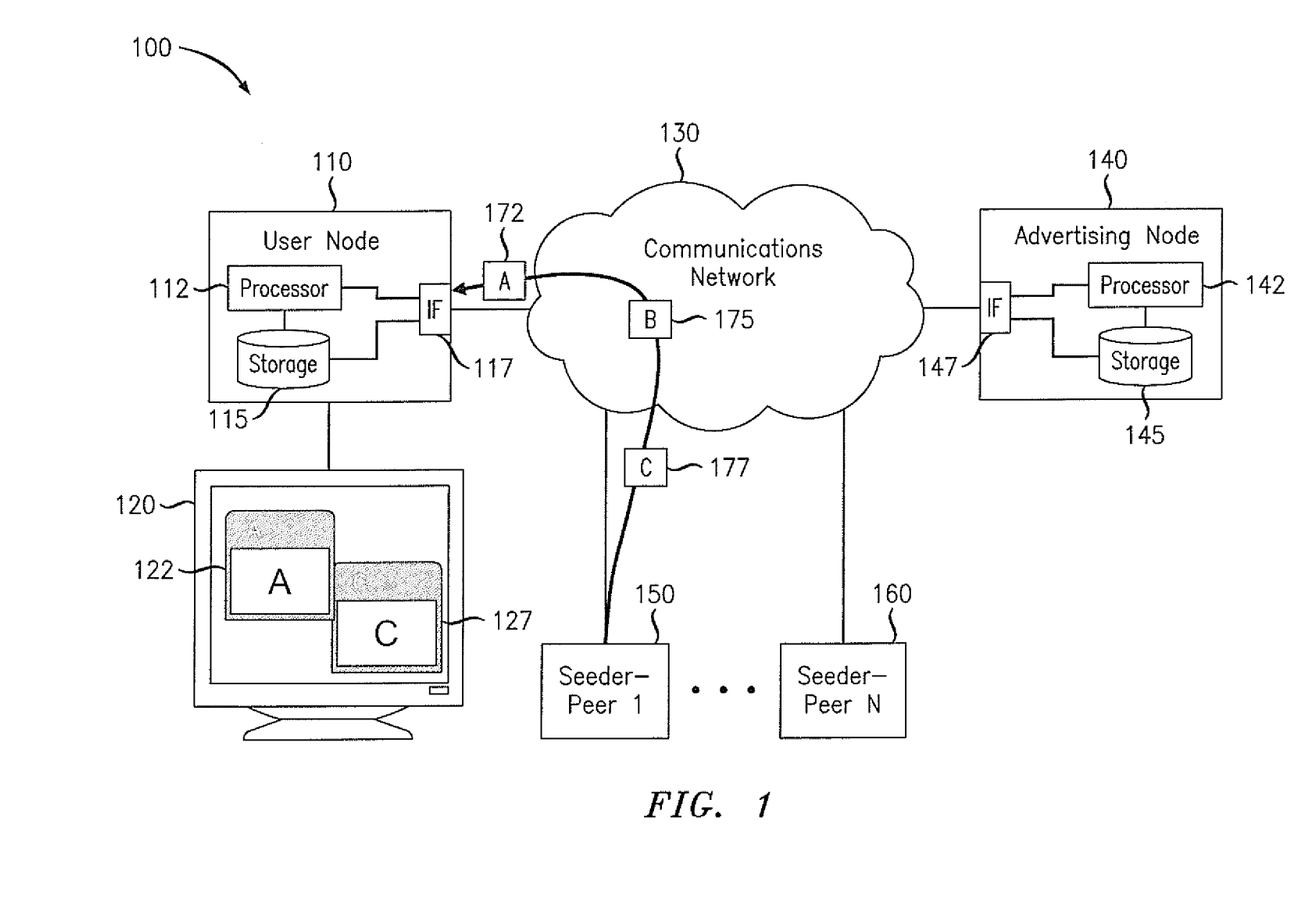
FIG. 1 is a schematic diagram of an exemplary network for providing privacy-conscious advertising.

FIG. 1 is a schematic diagram of an exemplary network 100 for providing privacy-conscious advertising. Network 100 includes a user node 110, a communications network 130, and an advertising node 140. Network 100 may also include a user display 120 and a number of seeder-peers 150, 160.

User node 110 may be a device that provides a user with advertisements determined to be relevant to the user. More specifically, in various exemplary embodiments, user node 110 is a personal or laptop computer, wireless email device, cell phone, or any other device capable of displaying advertisements and connecting to communications network 130. User node 110 may include a processor 112, storage 115, and network interface 117. User node 110 may further be connected to a user display 120.

Processor 112 may be a conventional microprocessor, a Field Programmable Gate Array (FPGA), or any other component configured to execute a series of instructions to control the interoperation of storage 115, network interface 117, and user display 120.

Storage 115 may be any machine-readable medium capable of storing user preferences and a number of advertisement messages received via communications network 130. User preferences may include a set of keywords or content descriptors that describe the content areas in which the user is interested.

Network interface 117 may be an interface comprising hardware and/or executable instructions encoded on a machine-readable storage medium configured to transmit and receive data over communications network 130. Network interface 117 may be used to receive advertisement messages and/or transmit user preferences.

User display 120 may a device connected to user node 110 and may be used to communicate an advertisement, such as advertisements 122, 127 to the user. More specifically, user display 120 may include any combination of a monitor, speakers, printer, or any other device capable of communicating an advertisement to a user. User display 120 may be separate from user node 110 or may constitute a component of user node 110, such as, for example, a screen on a laptop or cell phone. An advertisement may include any combination of video, audio, text, graphics, hyperlinks, or any other method of communicating with a user known to those of skill in the art. It should be noted that the term "display" as used herein refers to any method of communicating an advertisement to a user.

Communications network 130 may be any network for providing data communications between user node 110, advertising node 140, and seeder-peers 150, 160. Communications network 130 may be packet-switched or circuit switched. Further, communications network 130 may provide, for example, phone and Internet service to various user devices in communication with communications network 140.

Advertising node 140 may be a device for disseminating advertisement messages in exemplary network 100 and may be operated by an advertising entity such as, for example, a product manufacturer, an advertising agency, an advertisement aggregator, or an advertisement disseminator. More specifically, advertising node 140 may be a server, personal or laptop computer, or any other device capable of constructing and transmitting advertisement messages via communications network 130. Advertising node 140 may include a processor 142, storage 145, and network interface 147.

Processor 142 may be a conventional microprocessor, a Field Programmable Gate Array (FPGA), or any other component configured to execute a series of instructions to control the interoperation of storage 145 and network interface 147.

Storage 145 may be any machine-readable medium capable of storing user preferences and information regarding a number of advertisement messages to be disseminated via communications network 130. The manner in which user preferences and advertisement information are stored in storage 145 will be discussed in greater detail below with reference to FIGS. 2-3.

Network interface 147 may be an interface comprising hardware and/or executable instructions encoded on a machine-readable storage medium configured to transmit and receive data over communications network 130. Network interface 147 may be used to transmit advertisement messages and/or receive user preferences from user node 110.

Seeder-peers 150, 160 may be devices operated by other users that aid in the dissemination of advertisement messages. Seeder-peers 150, 160 may be other user nodes, operating in a manner similar to user node 110, or they may be devices specifically configured for the dissemination of advertisement messages. More specifically, in various exemplary embodiments, any seeder-peer 150, 160 may be a cell phone, personal or laptop computer, wireless email device, or any other device that supports peer-to-peer transfers of data. For example, seeder-peers 150,160 may be configured to receive and transmit data according to any P2P protocol known to those of skill in the art, including, but not limited to, BitTorrent, Gnutella, and Fast Track or a protocol specific to the operation of exemplary network 100. Alternatively, seeder-peers 150,160 may not be present and advertisement messages may be transmitted according to a non-P2P protocol.

Having described the components of network 100, a brief summary of the operation of network 100 will be provided. It should be apparent that the following description is intended to provide an overview of the operation of network 100 and is therefore a simplification in some respects. The detailed operation of network 100 will be described in further detail below in connection with FIGS. 2-5.

According to various exemplary embodiments, a user at user node 110 may manually enter personal information or user node 110 may automatically gather personal information for storage in storage 115. User node 110 may further receive a number of advertisement messages 172, 175, 177 via communications network 130, the advertisement messages 172, 175, 177 being sent by either advertising node 140 or one or more seeder-peers 150, 160. Each advertisement message 172, 175, 177 may contain meta-information describing the content of an advertisement associated with the advertisement message 172, 175, 177. For each advertisement message 172, 175, 177, user node 110 may compare the meta-information to the locally-stored user preferences to determine if the advertisement message 172, 175, 177 is relevant to the user. User node 110 may then fetch and display only those advertisements associated with advertisement messages 172, 175, 177 deemed relevant via user display 120.

For example, in exemplary network 100, user node 110 has received advertisement messages 172, 175, 177, each associated with advertisements "A," "B," and "C," respectively. By locally comparing the meta-information contained in each advertisement message 172, 175, 177 to the user preferences stored in storage 115, user node 110 determines that advertisement messages 172, 177 are relevant to the user, while advertisement message 175 is not. Accordingly, user node 110 displays only advertisements "A" 122 and "C" 127 via user display 120. In this manner, the user is presented with highly-targeted advertisements even though no personal information has been revealed outside of user node 110.

The user preferences stored in storage 115 may be obtained in various manners. For example, the user may manually enter or select a number of keywords or descriptors that identify the areas in which the user is interested. Alternatively, the user may enter personal information such as, for example, gender, age, and occupation. Using this personal information, user node 110 may automatically determine which areas the user is likely to be interested in. As a further alternative, user node may automatically determine the user's areas of interest by monitoring information such as, for example, browsing history, music library contents, or advertisements clicked on. Any combination of the described methods may be used, as well as any other method known to those of skill in the art.

The meta-information contained in advertisement messages 172, 175, 177 may be of any format capable of describing the content of the advertisements associated with advertisement messages 172, 175, 177. For example, the meta-information might use simple keywords or other subject identifiers. Under this embodiment, the meta-information of advertisement message 172 may include, for example, the keyword "computers." If the user preferences in storage 115 also contain the keyword "computers," user node 110 will deem advertisement message 172 relevant to the user.

Alternatively, the meta-information might include descriptors from a pre-arranged hierarchy or ontology of descriptors. This alternative method allows for more robust advertisement matching to be performed at user node 110. For example, under either of these embodiments, the meta-information of advertisement message 172 might still include the descriptor "computers," but the user preferences in storage may only contain the descriptor "electronics." User node 110 would recognize "computers" as being a subclass of "electronics" and thus deem advertisement message 172 relevant to the user.

As a further example of the robustness of using hierarchical or ontological descriptors, advertisement message 172 might still include the descriptor "computers," but the user preferences in storage may only contain the descriptor "video games." Here, while neither descriptor is a subclass of the other, user node 110 may recognize the two descriptors as belonging to the same major class or domain, "electronics" for example, and again deem advertisement message 172 relevant to the user.

Advertisement messages 172, 175, 177 may be disseminated in a peer-to-peer (P2P) manner. For example, advertising node 140 may initially send each advertisement message 172, 175, 177 to at least one seeder-peer 150, 160. After receiving an advertisement message 172, 175, 177, seeder-peers 150, 160 may then operate to send the advertisement message 172, 175, 177 to any other user nodes in exemplary network 100 that have not yet received the advertisement message 172, 175, 177, such as user node 110. In this manner, the bandwidth costs of sending advertisement messages to each user node 110 may be distributed throughout exemplary network 100. Alternatively, advertising node 140 may send each advertisement message to each user node 110 directly, thus removing the need for seeder-peers 150, 160.

To reduce bandwidth usage, advertisement messages 172, 175, 177 may not include the actual advertisement to be displayed. Instead, each advertisement message 172, 175, 177 may include only meta-information and an identifier of the advertisement. The identifier may be a Uniform Resource Identifier (URI) or any other identifier that may be associated with advertising content. Upon determining that a particular advertising message 172, 175, 177 is relevant, user node 110 may provide the user with a link to the advertisement or may automatically retrieve the advertisement for display. Alternatively, each advertisement message 172, 175, 177 may carry the advertisement to be displayed and, upon determining that an advertisement message 172, 175, 177 is relevant, user node 110 may simply display the advertisement carried by the advertisement message 172, 175, 177.

According to various exemplary embodiments, the user may choose to reveal some or all of their user preferences. The advertising node 140 and/or seeder-peers 150, 160 are then able to refrain from sending advertisements to user node 110 that are sure to be irrelevant to the user. This reduces the overall bandwidth consumed in exemplary network 100 and processing performed by user node 110. Specifically, by comparing the meta-information of an advertisement message to the subset of user preferences revealed by the user, the advertising node 140 and/or seeder-peers 150, 160 may determine whether an advertisement would certainly be irrelevant to the user and thus not transmit the irrelevant advertisement to user node 110. Alternatively, by revealing information, the user may subscribe to a number of streams of advertisement messages that only carry advertisements according to the revealed preferences. For example, by revealing an interest in the keyword "electronics," the user might enter a BitTorrent swarm, or other P2P grouping, devoted exclusively to advertisements relating to electronics.

Various exemplary embodiments provide for high-level filtering of revealed preferences in order to further ensure privacy. Under these embodiments, the subset of user preferences revealed to advertising node 140 and/or seeder-peers 150, 160 cannot be understood by the receiving device. For example, a method of secure computation may be used to allow for to advertising node 140 and/or seeder-peers 150, 160 to process a revealed subset of user preferences without the ability to determine what those user preferences actually are. Other zero-knowledgeness techniques will be apparent to those of skill in the art. By using such high level filtering, a user may request that only certain types of advertisements be sent to their user node without revealing personal information in a manner that can be understood by another.

Figure 2:
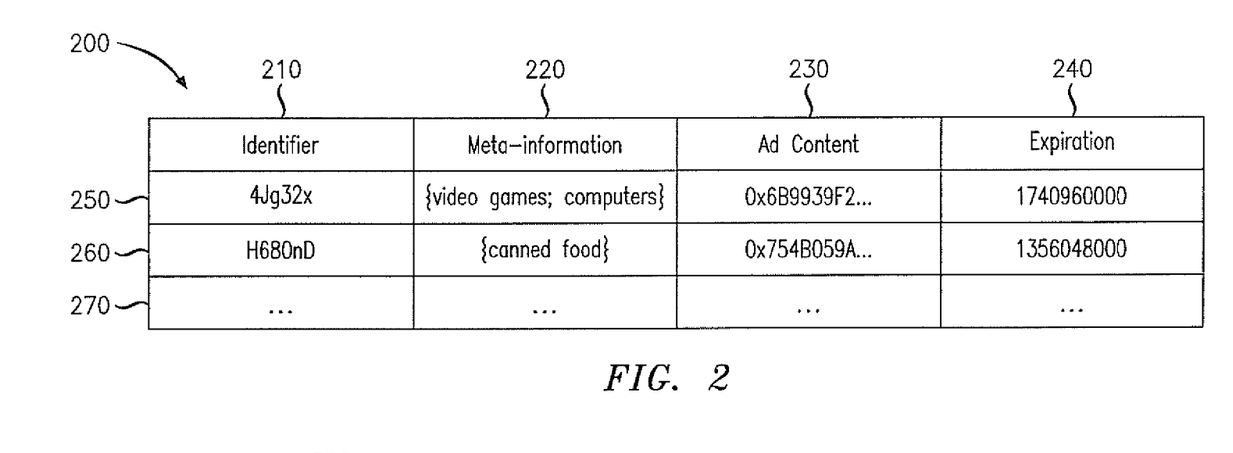
FIG. 2 is a schematic diagram of an exemplary data arrangement used to store information for each advertisement to be disseminated.

FIG. 2 is a schematic diagram of an exemplary data arrangement 200 used to store information for each advertisement to be disseminated. Data arrangement 200 may be, for example, a table in a database stored in storage 145 of advertising node 140. Alternatively, data arrangement 200 could be a series of linked lists, an array, or a similar data structure. Thus, it should be apparent that data arrangement 200 is an abstraction of the underlying data; any data structure suitable for storage of this data may be used.

Data arrangement 200 may include numerous sets of data: identifier field 210, meta-information field 220, ad content field 230, and expiration field 240. Identifier field 210 may include a URI or some other means of uniquely identifying an advertisement.

Meta-information field 220 may include a set of one or more identifiers that describe the content of an advertisement. These identifiers may be keywords, hierarchical descriptors, ontological descriptors, or any other descriptor known to those of skill in the art.

Ad content field 230 may contain the actual advertisement data that is to be displayed by user node 110. Alternatively, ad content field 230 may not be present in data arrangement 200. In such an alternative embodiment, the advertisement data may instead be located on a node other than advertising node 140 and may accessible through a URI or any other means for requesting data specified by an identifier known to those of skill in the art.

Expiration field 240 may include an indication of an expiration date, after which the associated advertisement is no longer valid and should not be disseminated and/or displayed. The expiration date may be expressed in any manner known to those of skill in the art, such as, for example, time to live or Unix time. The expiration date may further be included in each advertisement message 172, 175, 177 and might be used by the advertising node 140 and seeder-peers 150, 160 to prioritize the order in which advertisement messages 172, 175, 177 are transmitted. The expiration date may also be used by user node 110 to prioritize the order in which advertisement messages 172, 175, 177 are processed for potential relevance. Alternatively, expiration field 240 may not be present and advertisements may remain valid indefinitely or until the corresponding advertisement record is removed from storage 145.

As an example, advertisement record 250 indicates than an advertisement identified by the string "4Jg32x" is to be disseminated. The advertisement is associated with a set of two pieces of meta-information, the keywords "video games" and "computers." Further, the content of the advertisement is represented in hexadecimal as "0x6B9939F2 . . . " and the advertisement expires at Unix time "1740960000."

Advertisement record 260 indicates than an advertisement identified by the string "H680nD" is also to be disseminated. The advertisement is associated with a set of only one piece of meta-information, the keyword "canned food." Further, the content of the advertisement is represented in hexadecimal as "0x754B059A . . . " and the advertisement expires at Unix time "1356048000." Data arrangement 200 may contain numerous additional advertisement records 270.

Figure 3:
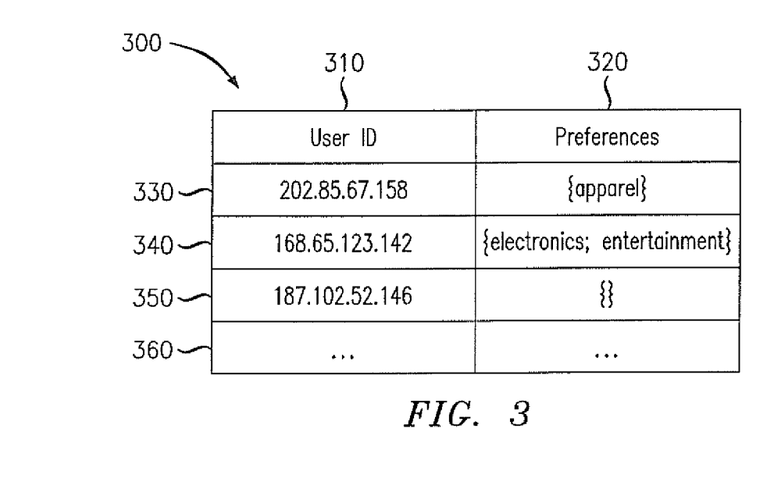
FIG. 3 is a schematic diagram of an exemplary data arrangement for storing the preferences of each user at a central node.

FIG. 3 is a schematic diagram of an exemplary data arrangement 300 for storing the preferences of each user at a central node, such as advertising node 140. Data arrangement 300 may be, for example, a table in a database stored in storage 145. Alternatively, data arrangement 300 could be a series of linked lists, an array, or a similar data structure. Thus, it should be apparent that data arrangement 300 is an abstraction of the underlying data; any data structure suitable for storage of this data may be used. In various embodiments utilizing a P2P protocol for advertisement dissemination, in order to ensure delivery of advertisement messages in accordance with revealed preferences, seeder-peers 150, 160 may also store a copy of data arrangement 300 or seeder-peers 150, 160 may be coordinated or otherwise controlled by advertising node 140. In various embodiments, advertising node 140 and/or seeder-peers 150, 160 may not store user preferences at all and, thus, data arrangement 300 is not present in either storage 145 of advertising node 140 or seeder-peers 150, 160.

Data arrangement 300 may include numerous sets of data: user id field 310 and preferences field 320. User id field 310 may be an IP address, user name, or any other piece of information that may be used to identify a particular user. Preferences field 320 may include a set of zero or more identifiers that describe the content areas that a particular user claims to have an interest in. These identifiers may be keywords, hierarchical descriptors, ontological descriptors, or any other descriptor known to those of skill in the art.

As an example, user record 330 indicates that the user at IP address 202.85.67.158 has indicated an interest in the keyword "apparel." Accordingly, advertising node 140 and/or seeder-peers 150, 160 will attempt to deliver "apparel"-related advertisement messages related to the user at 202.85.67.158.

Likewise, user record 340 indicates that the user at IP address 168.65.123.142 has indicated an interest in the keywords "electronics" and "entertainment." Accordingly, advertising node 140 and/or seeder-peers 150, 160 will attempt to deliver "electronics"- or "entertainment"-related advertisement messages to the user at 168.65.123.142.

User record 350 indicates that the user at IP address 187.102.52.146 has not chosen to reveal any portion of their user preferences. Accordingly, advertising node 140 and/or seeder-peers 150, 160 will deliver advertising messages of any content type to the user at 187.102.52.146. Note that the user nodes for each of these users may continue to process each received message according to the locally-stored full set of user preferences to make the ultimate determination of relevance. Data arrangement 300 may contain numerous additional user records 360.

Figure 4:
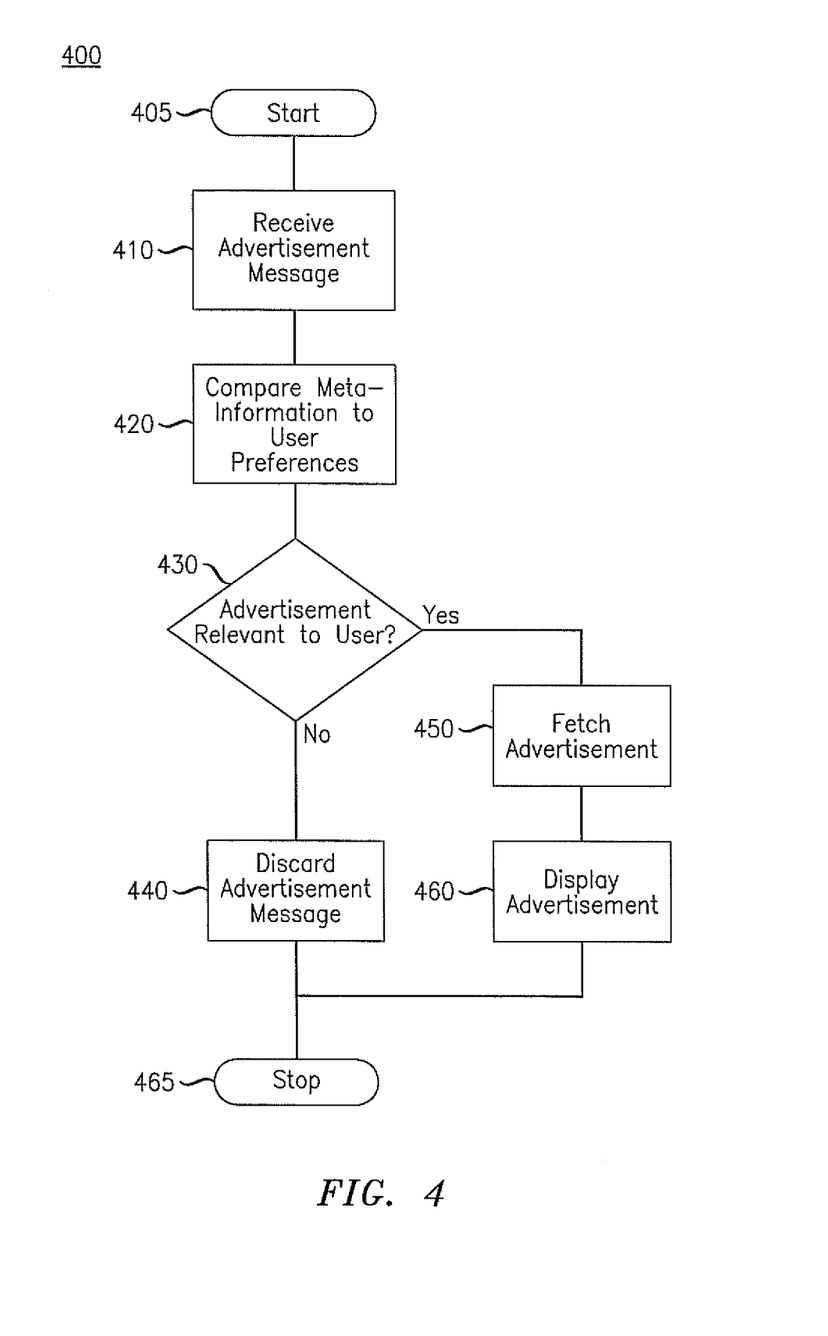
FIG. 4 is a flowchart of an exemplary method for determining what advertisements to present to a user.

FIG. 4 is a flowchart of an exemplary method 400 for determining what advertisements to present to a user. Exemplary method 400 may be performed by the components of user node 110 to determine the relevance of each received advertisement message and display the relevant advertisements.

Exemplary method 400 starts in step 405 and proceeds to step 410 where user node 110 receives an advertisement message via communications network 130. Exemplary method 400 may then proceed to step 420. Alternatively, user node may additionally perform the steps of placing the advertisement message in a buffer (not shown), reordering the messages according to their expiration dates (not shown), and/or selecting an advertisement message from the buffer to process for relevance (not shown).

At step 420, user node 110 may compare the meta-information contained in the advertisement message with the locally stored user preferences to determine if the advertisement message is relevant to the user. This comparison may include simply comparing the keywords in the meta-information to the keywords in the user preferences. Alternatively, user node 110 may refer to a predetermined hierarchy or ontology of content descriptors to determine whether a particular advertisement message is relevant to the user.

Exemplary method 400 may then move to step 430 where, if the advertisement message is determined to not be relevant to the user, exemplary method 400 moves on to step 440. At step 440, the advertisement message may be discarded. Alternatively, user node 110 may store the advertisement message so it may be processed again at a later time if the user preferences change. Method 400 may then stop at step 465.

If, instead, the advertisement message is determined to be relevant to the user at step 430, method 400 may proceed to step 450. At step 450, the user node 110 may use the identifier in the advertisement message to fetch the corresponding advertisement, either from advertising node 140, another server (not shown) connected to communications network 130, or from memory in the case where the advertisement message contains the advertisement itself. Method 400 may then move to step 460, where user node 110 may display the fetched advertisement via user display 120. As an alternative to steps 450, 460, user node 110 may perform the step of providing a link to the advertisement for the user to follow. Method 400 may then stop at step 465.

Figure 5:
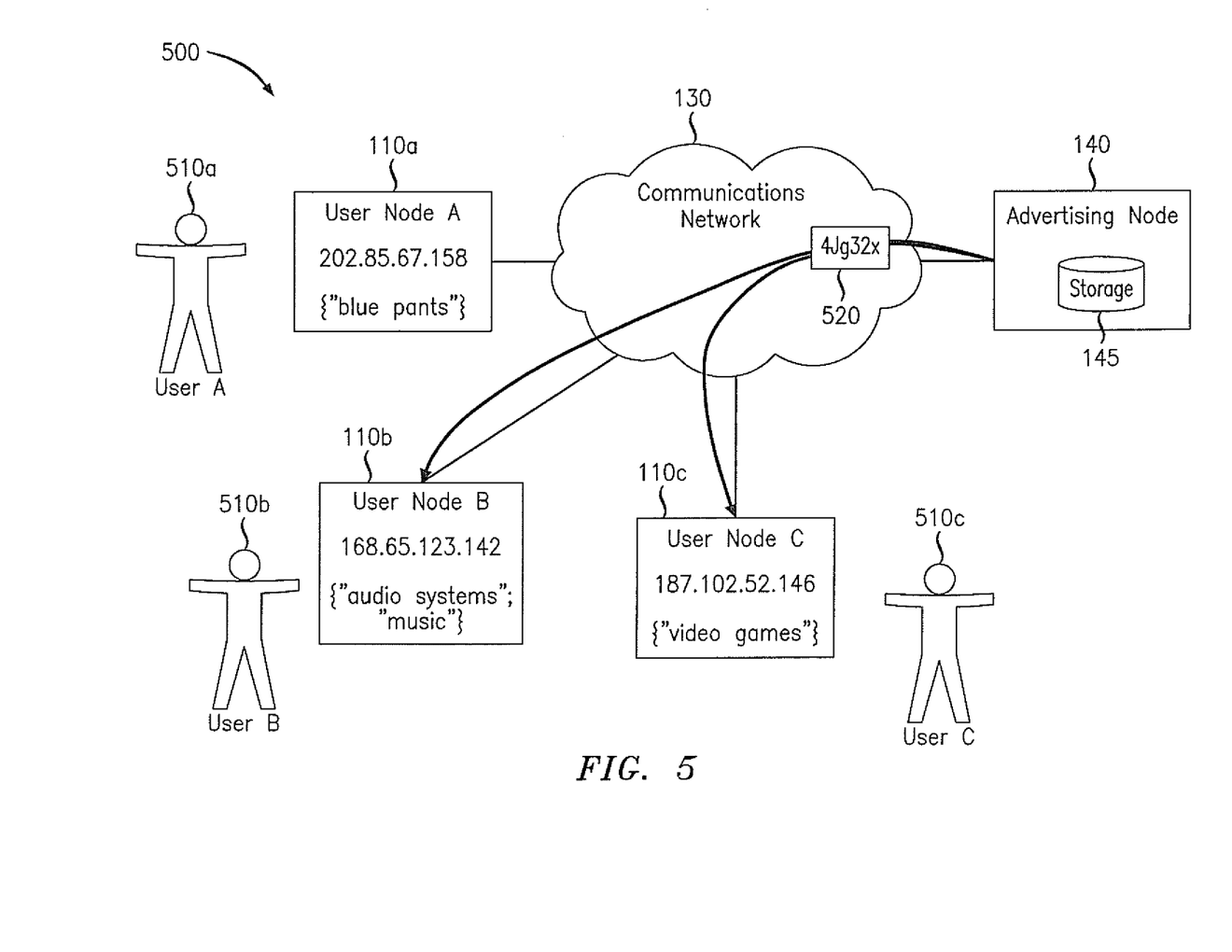
FIG. 5 is a schematic diagram of an alternative view of an exemplary network for providing privacy conscious advertising.

FIG. 5 is a schematic diagram of an alternative view of an exemplary network 500 for providing privacy conscious advertising. Exemplary network 500 includes user nodes A-C 110a, 110b, 110c, communications network 130, and advertising node 140. User node A 110a may be located at 202.85.67.158, include the user preferences set {"blue pants"}, and correspond to user record 330 of exemplary data arrangement 300. User node B 110b may be located at 168.65.123.142, include the user preferences set {"audio systems"; "music"}, and correspond to user record 340 of exemplary data arrangement 300. User node C 110c may be located at 187.102.52.146, include the user preferences set {"video games"}, and correspond to user record 350 of exemplary data arrangement 300. User nodes A-C 110a, 110b, 110c may be used by users A-C 510a, 510b, 510c, respectively.

For the purposes of demonstration, exemplary network 500 is configured according to the embodiment in which advertisement messages are sent directly from advertising node 140 to user nodes 110a-c. Storage 145 of advertising node 140 currently contains data arrangements 200,300, as described above in connection with FIGS. 2-3.

Advertising node 140 begins by constructing an advertisement message 520 according to advertisement record 250. Advertisement message 520 includes the advertisement identifier "4Jg32x" and the meta-information set "{video games; computers}." Advertising node 140 then sends advertisement message 520 to user nodes B and C 110b, 110c.

Advertising node 140 does not send advertisement message 520 to user node A 110a because user A 510a has previously indicated an interest only in "apparel." Thus, because advertisement message 520 is related to "video games" and "computers," it would not be relevant to the user A 510a. Advertisement message 520 is sent to user node B 110b because the revealed preferences stored in user record 340 include the keyword "electronics." Both "video games" and "computers" are subsets of "electronics," so advertising node 140 concludes that advertisement message 520 might be relevant to the user B 510b. The advertisement message is also sent to user node C 110c because user C 510c has not revealed any preferences, as shown by user record 350, indicating that all advertisements should be sent to user node C 110c for local processing.

When user node B 110b receives advertisement message 520, it processes the message for relevance. User node B 110b will determine that advertisement message 520 is not relevant to user B 510b because neither "video games" nor "computers" match either "audio systems" or "music." User node B 110b will then discard advertisement message 520. Note that even though advertisement message 520 matched the preferences previously revealed to advertising node 140 and stored in user record 340, user node B 110b still deemed advertisement message 520 irrelevant in light of the full set of locally-stored preferences for user B 510b.

Likewise, when user node C 110c receives advertisement message 520, it processes the message for relevance. Here, however, user node C will determine that advertisement message 520 is relevant to user C 510c because there is a direct match of the keyword "video games" between the meta-information of advertising message 520 and the user preferences stored at user node C 110c. User node C 110c will then request the advertisement associated with advertisement identifier "4Jg32x" from advertising node 140 which will, in turn, respond with a message including ad content "0x6B9939F2 . . . ." Finally, user node C 110c will display ad content "0x6B9939F2 . . . " to user C 510c.

According to the foregoing, various exemplary embodiments provide for privacy-conscious, user-targeted advertising. In particular, by storing the user's preferences locally and comparing them to the meta-information contained in each received advertisement message, a user node may determine the advertisement message's relevance to the user. Accordingly, by determining locally what advertisements are relevant to the user, the user is able to receive targeted advertisements while revealing a minimal amount of personal information to others.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of providing privacy-conscious advertising to a user performed in a user node in a communications network, the method comprising:
   receiving a plurality of advertisement messages via the communications network, each advertisement message of the plurality of advertisement messages including a set of meta-information which describes the content of an advertisement associated with the advertisement message;
   determining whether each advertisement message is relevant to the user by comparing the set of meta-information to a set of user preferences associated with the user, the set of user preferences stored locally on the user node;
   when an advertisement message is determined to not be relevant to the user, discarding the advertisement message; and
   when an advertisement message is determined to be relevant to the user, providing the user with access to the advertisement associated with the advertisement message;
   receiving a selection from the user of a subset of the set of user preferences to reveal to a central entity; and
   transmitting a message to the central entity, the message including the subset of user preferences and indicating that the user node should only receive advertisement messages relevant to the subset of user preferences.

2. The method of claim 1, wherein:
the set of meta-information for an advertisement message of the plurality of advertisement messages comprises a first identifier associated with a first area of interest;
the set of user preferences comprises a second identifier associated with a second area of interest; and
the step of determining whether an advertisement message is relevant to the user comprises comparing the first identifier to the second identifier.

3. The method of claim 2, wherein the step of determining whether an advertisement message is relevant to the user further comprises, when the first area of interest is a subset of the second area of interest, determining that the advertisement message is relevant to the user.

4. The method of claim 1, further comprising receiving the set of user preferences from the user.

5. The method of claim 1, wherein each advertisement message includes an advertisement identifier and the step of providing access comprises:
retrieving an advertisement associated with the advertisement identifier via the communications network; and
displaying the advertisement to the user.

6. The method of claim 1, wherein the communications network is a peer-to-peer network.

7. The method of claim 6, wherein the step of receiving a plurality of advertisement messages comprises receiving at least one advertisement message from a peer device via the peer-to-peer network.

8. The method of claim 1, wherein high-level filtering is used to prevent the central entity from recognizing areas of interest identified by the subset of user preferences.

9. The method of claim 1, wherein each advertisement message includes an expiration date and the plurality of advertisement messages is processed according to the order of the expiration dates of the advertisement messages contained therein.

10. The method of claim 8, wherein the high-level filtering comprises a method of secure computation.

11. A machine readable storage medium encoded with instructions for providing privacy-conscious advertising to a user of a user node in a communications network, the instructions comprising:
instructions for establishing a set of user preferences associated with the user;
instructions for receiving an advertisement message via the communications network, the advertising message including meta-information;
instructions for determining whether the advertisement message is relevant to the user by comparing the meta-information to the set of user preferences;
instructions for, when the advertisement message is not relevant to the user, discarding the advertisement message;
instructions for, when the advertisement message is relevant to the user, providing the user with access to an advertisement associated with the advertisement message;
instructions for receiving a selection from the user of a subset of the set of user preferences to reveal to a central entity; and
instructions for transmitting a message to the central entity, the message including the subset of user preferences and indicating that the user node should only receive advertisement messages relevant to the subset of user preferences.

12. The machine readable storage medium of claim 11 wherein:
the meta-information for the advertisement message comprises a first identifier associated with a first area of interest;
the set of user preferences comprises a second identifier associated with the second area of interest; and
the instructions for determining whether the advertisement message is relevant to the user comprises instructions for comparing the first area of interest to the second area of interest.

13. The machine readable storage medium of claim 11 wherein the advertisement message includes an advertisement identifier and the instructions for providing access comprise:
instructions for retrieving an advertisement associated with the advertisement identifier via the communications network; and
instructions for displaying the advertisement to the user.

14. The machine readable storage medium of claim 11 wherein the communications network is a peer-to-peer network and the instructions for receiving an advertisement message comprise instructions for receiving an advertisement message from a peer device via the peer-to-peer network.

15. The machine readable storage medium of claim 11, wherein high-level filtering is used to prevent the central entity from recognizing areas of interest identified by the subset of user preferences.

16. An advertisement dissemination system in a communications network for providing privacy-conscious advertising, the system comprising:
an advertisement node that transmits a plurality of advertisement messages via the communications network, each advertisement message including a set of meta-information; and
a user node that:
receives an advertisement message of the plurality of advertisement messages via the communications network,
compares the set of meta-information of the advertisement message to a set of locally stored user preferences to determine whether the advertisement message is relevant to a user of the user node,
discards the advertisement message when the advertisement message is not relevant to the user,
provides the user with access to an advertisement associated with the advertisement message when the advertisement message is relevant to the user, and
transmits a subset of the set of locally stored user preferences via the communications network to indicate that the user node should only receive advertisements relevant to the subset of user preferences;
wherein the advertising node receives the subset of user preferences and prevents advertisement messages that are not relevant to the subset of user preferences from being transmitted to the user node.

17. The system of claim 16 further comprising a seeder-peer that receives the advertisement message from the advertising node and transmits the advertisement message to the user node.

18. The system of claim 16 wherein:
each advertisement message of the plurality of advertisement messages further includes an advertisement identifier; and
in providing the user with access to an advertisement, the user node:
transmits a request for an advertisement associated with an advertisement identifier of the advertisement message via the communications network,
receives the advertisement via the communications network, and
displays the advertisement to the user.

19. The system of claim 16, wherein each advertisement message further includes the advertisement.

20. The system of claim 16, wherein high-level filtering is used to prevent the central entity from recognizing areas of interest identified by the subset of user preferences.

\* \* \* \* \*

UNITED STATES PATENT AND TRADEMARK OFFICE
CERTIFICATE OF CORRECTION

| | |
|---|---|
| PATENT NO. | : 9,508,079 B2 |
| APPLICATION NO. | : 12/545633 |
| DATED | : November 29, 2016 |
| INVENTOR(S) | : Kumar et al. |

It is certified that error appears in the above-identified patent and that said Letters Patent is hereby corrected as shown below:

On the Title Page

Item [54] and in the Specification, Column 1, Line 1, delete "Privacy-Counscious Advertising" and insert --Privacy-Conscious Advertising--

Signed and Sealed this
Twenty-eighth Day of February, 2017

Michelle K. Lee
*Director of the United States Patent and Trademark Office*